J. F. STEWART.
Wind-Mills.
No. 140,854.
Patented July 15, 1873.
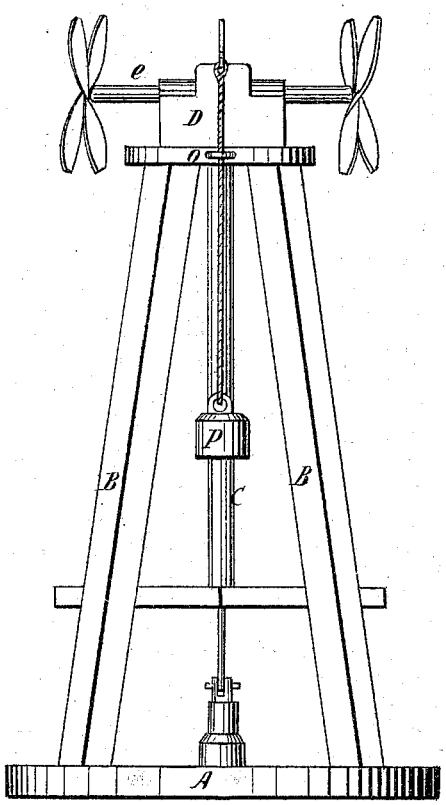
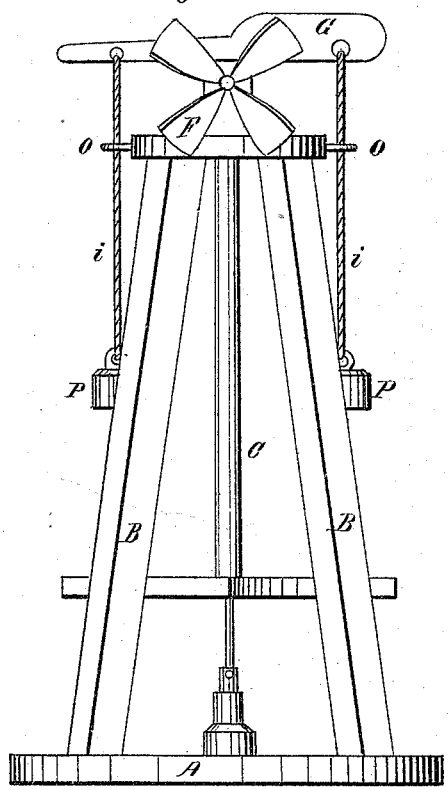
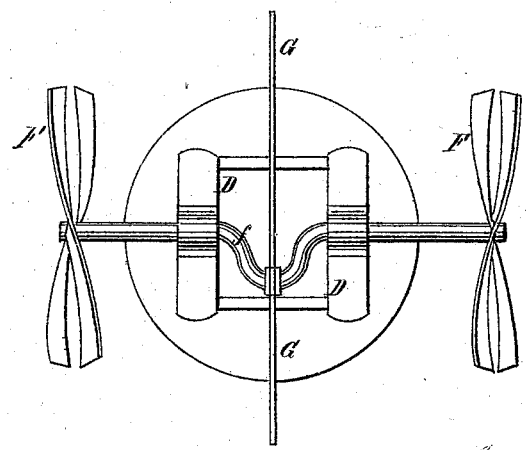

UNITED STATES PATENT OFFICE.

JOHN F. STEWART, OF MODESTO, CALIFORNIA.

IMPROVEMENT IN WINDMILLS.

Specification forming part of Letters Patent No. 140,854, dated July 15, 1873; application filed May 19, 1873.

*To all whom it may concern:*

Be it known that I, JOHN F. STEWART, of Modesto, Stanislaus county, State of California, have invented an Improved Windmill; and I do hereby declare the following description and accompanying drawings are sufficient to enable any person skilled in the art or science to which it most nearly appertains to make and use my said invention or improvement without further invention or experiment.

My invention relates to what I call a duplex or balanced windmill, its construction being such that one wind-wheel is employed to balance the other, and thus avoid the twisting strain upon the wheel-shaft which causes so much friction in the ordinary single-wheeled windmill.

My improved windmill is simple, cheap, and self-regulating.

In order to more fully illustrate and explain my invention, reference is had to the accompanying drawings forming a part of this specification, in which—

Figure 1 is an elevation, showing a side view of the wheel. Fig. 2 is an elevation, showing a front view of the wheel. Fig. 3 is a plan or top view.

A is the base and B B the frame of a windmill. C is the upright swiveling-shaft, and D is the hollow block or box, which is secured at the upper end of the shaft C, so as to support the wheel-shaft. The wheel-shaft $e$ has the usual crank $f$ at its middle instead of near one end, as usual, and, instead of extending to one side of the block or box D in the usual way, I secure it in boxes so that it shall project an equal distance on each side of the block or box. I then attach a wind-wheel, F, to each end of the shaft, as shown, so that the strain of the shaft on its boxes will be equalized. At right angles to the line of the shaft $e$ and midway between the wheels F I secure the rudder-vane G to the box or block D above the shaft. One end of the rudder-vane is made small, while the other is made wide, so that the wind will act readily upon it. I then attach a cord or wire, $i$, to either one or both ends of the rudder-vane and carry it down through an eye, $o$, which is secured in the permanent top of the frame B B, and to the lower end of the cord or wire I attach a weight, $p$.

Now it will be seen that the action of the wind upon the rudder-vane G will turn the box D and cause it to carry the wind-wheels out of the wind as the force of the wind increases in intensity, while the weight $p$ will draw it back again when the wind lulls, thus providing a self-regulating windmill.

By employing the two wind-wheels I not only balance the shaft $e$, but also obtain a greater percentage of power from the force of the wind, as both will act in unison and serve to increase the power of the mill.

I am aware that two wind-wheels have been arranged on the opposite ends of a shaft, so as to balance each other; this I do not broadly claim; but

Having thus described my invention, what I claim, and desire to secure by Letters Patent, is—

A duplex or balanced self-regulating windmill, having the shaft $e$, wind-wheels F, transverse rudder-vane G, cords $i$, and weight $p$, all arranged and combined substantially as above described, and for the purposes set forth.

In witness whereof I hereunto set my hand and seal.

JOHN F. STEWART. [L. S.]

Witnesses:
A. F. NOLES,
F. P. BENNETT.